United States Patent
Carles et al.

(10) Patent No.: US 8,086,851 B2
(45) Date of Patent: Dec. 27, 2011

(54) METHODS FOR BROADCASTING AND RECEIVING A SCRAMBLED MULTIMEDIA PROGRAMME, NETWORK HEAD, TERMINAL, RECEIVER AND SECURITY PROCESSOR FOR THESE METHODS

(75) Inventors: Philippe Carles, Meudon (FR); Anthony Chevallier, Saint Cyr l'Ecole (FR); Gilles Dubroeucq, Saint Piat (FR); Stéphane Lanfranchi, Paris (FR)

(73) Assignee: VIACCESS, Paris la Defense Cedex (FR)

( * ) Notice: Subject to any disclaimer, the term of this patent is extended or adjusted under 35 U.S.C. 154(b) by 452 days.

(21) Appl. No.: 12/303,639

(22) PCT Filed: Jun. 13, 2007

(86) PCT No.: PCT/FR2007/000984
§ 371 (c)(1),
(2), (4) Date: Dec. 5, 2008

(87) PCT Pub. No.: WO2007/144510
PCT Pub. Date: Dec. 21, 2007

(65) Prior Publication Data
US 2010/0228971 A1 Sep. 9, 2010

(30) Foreign Application Priority Data

Jun. 14, 2006 (FR) ...................................... 06 05296

(51) Int. Cl.
*H04L 9/00* (2006.01)
*H04N 7/167* (2006.01)

(52) U.S. Cl. ........ 713/163; 713/169; 713/170; 380/200; 380/201

(58) Field of Classification Search .......... 380/200–203, 380/210, 212; 713/168–171, 163; 705/57–59; 725/25, 30–31
See application file for complete search history.

(56) References Cited

U.S. PATENT DOCUMENTS

| | | |
|---|---|---|
| 5,029,207 A | 7/1991 | Gammie |
| 6,714,649 B1 | 3/2004 | Masuda et al. |
| 2005/0182931 A1* | 8/2005 | Robert et al. ................. 713/168 |

OTHER PUBLICATIONS

Menezes, Vanstone, Oorschot; Handbook of Applied Cryptography, 1997, CRC Press LLC, pp. 551-553.

* cited by examiner

*Primary Examiner* — Hosuk Song
(74) *Attorney, Agent, or Firm* — B. Aaron Schulman, Esq.; Terry L. Wright, Esq.; Stites & Harbison PLLC (57) ABSTRACT

A method of broadcasting a scrambled multimedia program, by way of a broadcast network, in which before transmitting a license key; a network head carries out a step of authenticating a terminal, and if the terminal has successfully authenticated, the network heads sends the terminal a license transmission message containing the license key or cryptogram of the license key, by way of a point-to-point link, and if the terminal is not successfully authenticated, the network head acts (at 200) in such a way as to prevent the complete descrambling by this terminal of the scrambled multimedia program broadcast.

15 Claims, 5 Drawing Sheets

METHODS FOR BROADCASTING AND RECEIVING A SCRAMBLED MULTIMEDIA PROGRAMME, NETWORK HEAD, TERMINAL, RECEIVER AND SECURITY PROCESSOR FOR THESE METHODS

The present invention relates to methods for broadcasting and receiving a scrambled multimedia program and to a network head, a terminal, a receiver and a security processor for these methods.

Methods for broadcasting multimedia programs by way of broadband networks exist in which:
information can be routed to a multicast address so that only one group of several terminals corresponding to this multicast address receives the information while other terminals connected to the same network do not receive this information, and
information can be routed to a unicast address so that only the terminal corresponding to this unicast address receives the information while the other terminals connected to the same network do not receive it.

For example, such a network is a network based on the IP protocol (Internet Protocol) such as the Internet network, which is also known as the world wide web.

In the existing methods, a network head:
scrambles the multimedia program with a control word,
encrypts the control word in order to obtain a first cryptogram,
encrypts the first cryptogram in order to obtain a second cryptogram, the first and second encryptions being effected by means of different encryption keys selected from the group composed of a processing key and a license key,
multiplexes the second cryptogram with the scrambled multimedia program to obtain multiplexed contents,
broadcasts the multiplexed contents to a multicast broadcast address in order to establish a point-to-multipoint connection between the network head and several receivers of the multiplexed contents, and
on a point-to-point link established with a terminal using the unicast address of this terminal, transmits the license key individually to this terminal by way of this point-to-point link.

At the same time, terminals connected to the same network execute a method for receiving the scrambled multimedia programs broadcast. In existing receiving methods, the terminal:
monitors the multicast broadcast address and receives the multiplexed contents,
demultiplexes the multiplexed contents received in order to obtain the second cryptogram and the scrambled multimedia program,
decrypts the second cryptogram in order to obtain the first cryptogram,
decrypts the first cryptogram in order to obtain the control word, the first and second decryptions being effected by means of different encryption keys selected from the group composed of the processing key and the license key, and
unscrambles the scrambled multimedia program with the control word.

In the following description, the license key is denoted $K_{Term}$.

What is meant here by cryptogram of the key $K_{Term}$ is encrypted contents constructed by encrypting the result of the concatenation of the key $K_{Term}$, optionally with other data. Thus, at the very least, a cryptogram of the key $K_{Term}$ is obtained by encrypting the key $K_{Term}$ only. In other cases, this cryptogram is obtained by encrypting the result of the concatenation of the key $K_{Term}$ with other data.

In existing methods, and unlike other existing methods for broadcasting and receiving scrambled multimedia programs by satellite, the control word is encrypted at least twice and the decryption of the control word by each terminal requires, in addition to a processing key $K_{Proc}$, the license key $K_{Term}$ obtained by way of a point-to-point link.

Although entirely satisfactory, it is nowadays desirable to improve the security of existing methods even further in order to prevent the "pirating" of multimedia programs by unscrupulous persons.

The invention therefore aims to satisfy this desire by proposing a more secure method for broadcasting and a more secure method for receiving scrambled multimedia programs.

The invention therefore relates to such a method for broadcasting scrambled multimedia programs in which:
the network head carries out a step of authenticating the terminal, and
if the terminal has been successfully authenticated, the network head sends to the terminal a license transmission message containing the license key or a cryptogram of the license key, by way of the point-to-point link established, and
if the terminal is not successfully authenticated, the network head acts in such a manner as to prevent the complete unscrambling by this terminal of the scrambled multimedia program broadcast.

The invention relates also to a method for receiving the scrambled multimedia program broadcast by means of the above method, in which, during the authentication step, the terminal cooperates with the network head in order to be authenticated.

In the above methods, the key $K_{Term}$ or its cryptogram is transmitted to the terminal only if the latter has been correctly authenticated beforehand by the network head. This increases the security of the method by rendering the design of "pirate" terminals more difficult.

The embodiments of the broadcasting method may comprise one or more of the following features:
if the terminal has been successfully authenticated, the network head carries out a phase of establishing a secure tunnel on the point-to-point link established, during which the network head establishes, by random selection, a session key common to the terminal and to the network head, then sends to the terminal the license transmission message encrypted with this session key;
the network head determines a unique key suitable for identifying the terminal from among all of the terminals connected to the network, on the basis of:
pre-recorded data which are known to the network head and which have not been transmitted to it by the terminal, and
data transmitted by the terminal to the network head, the pre-recorded data and the transmitted data each being insufficient by themselves to permit the determination of the unique key used by this terminal,
then checks that the terminal is capable of correctly encrypting or decrypting data with the unique key which it has determined without the network head having had to transmit to this terminal beforehand the pre-recorded data or the unique key determined, and, in the affirmative, establishes that the terminal is authenticated;
in order to check that the terminal is capable of correctly decrypting encrypted data with the unique key determined, the network head sends an ECM message (Entitlement Control Message) to the terminal in which the field which is to contain a cryptogram of a control word contains a cryptogram obtained by encrypting a datum unknown to the terminal by means of the unique key determined, then checks that the datum unknown to the terminal has been correctly decrypted by this terminal;

the network head encrypts the license key at least by means of the key of the security processor of the terminal in order to obtain a cryptogram of the license key, and incorporates this cryptogram of the license key in the license transmission message;

the network head carries out consecutively over time a first and second encryption of the license key in order to obtain a cryptogram of the license key, the first and second encryptions being carried out by means of different encryption keys selected from the group composed of the processor key and the key for encrypting the license key, and incorporates only this cryptogram containing the twice-encrypted license key in the license transmission message.

The embodiments of the receiving method may comprise one or more of the following features:

during the phase of establishing the secure tunnel:
a) if the terminal has been successfully authenticated, the terminal cooperates with the network head to establish the common session key and decrypts the license transmission message received by means of the common session key, and
b) if the terminal is not successfully authenticated, the terminal is prevented from unscrambling the multimedia program;

the terminal also carries out a step of authenticating the network head and, if the network head has been successfully authenticated, the terminal obtains the license key from the license transmission message, whereas, if the network head has not been successfully authenticated, the terminal is prevented from unscrambling the multimedia program;

during the step of authenticating the network head, the terminal checks that the network head is capable of correctly encrypting or decrypting data with the unique key determined by the network head on the basis of:
pre-recorded data which are known to the network head and which have not been transmitted to it by the terminal, and
data transmitted by the terminal to the network head, the pre-recorded data and the transmitted data each being insufficient by themselves to permit the determination of the unique key of this terminal;

the security processor decrypts the cryptogram of the license key by means of the processor key;

the security processor and the receiver carry out consecutively a first and second decryption of a cryptogram of the license key, the first and second decryptions being carried out by means of a different first and second decryption key, respectively, selected from the group composed of the processor key and the key for encrypting the license key.

The invention relates also to a network head and a terminal which are capable of implementing the above methods of broadcasting and receiving, respectively.

The invention relates also to a receiver and a security processor for the above terminal.

The invention will be better understood on reading the following description which is given purely by way of non-limiting example and with reference to the drawings in which.

Figure 1:
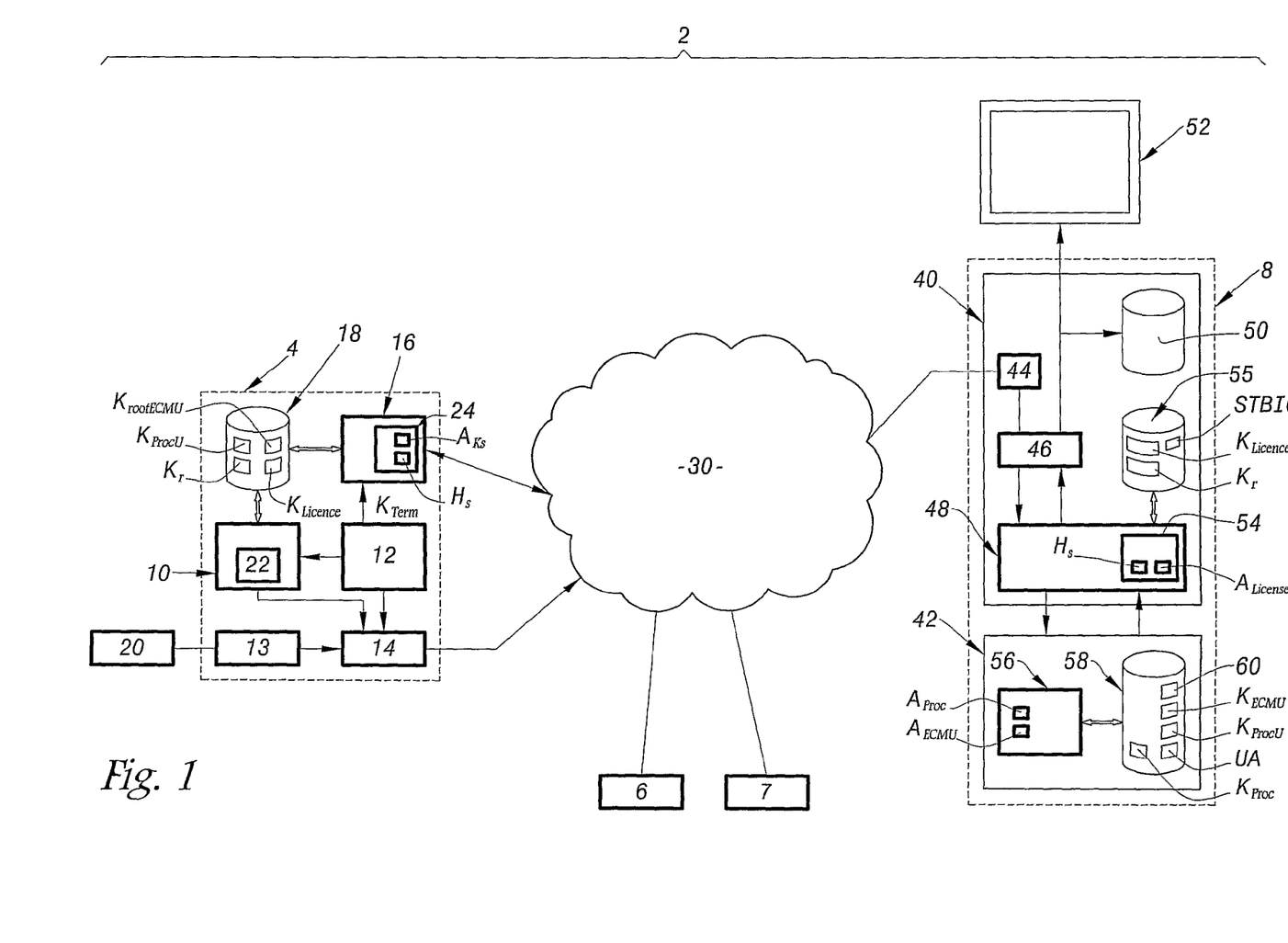
FIG. 1 is a schematic illustration of the architecture of a system for broadcasting and receiving scrambled multimedia programs.

FIG. 1 shows a system 2 for broadcasting and receiving scrambled multimedia programs. This system 2 comprises one or more network heads capable of broadcasting multimedia programs in a scrambled form and a multitude of terminals suitable for receiving these scrambled multimedia programs in order to unscramble them so that they can use them. For example, the terminal uses the multimedia programs received in order to generate a video stream which can be displayed in clear on a screen.

In order to simplify FIG. 1, only one network head 4 and three terminals 6, 7 and 8 have been shown.

The network head 4 comprises:
a generator 10 of ECM messages (Entitlement Control Message),
a generator 12 of EMM messages (Entitlement Management Message),
a scrambler 13 suitable for scrambling a multimedia program by means of a control word CW,
a module 14 suitable for broadcasting multiplexed contents on one or more multicast broadcast addresses,
a manager 16 of access rights, called an ORM manager (On-line Rights Manager), suitable for communicating a license key $K_{Term}$ to the terminals so that they can unscramble the scrambled multimedia programs, and
means for storing information, such as a memory 18 containing pre-recorded secret information.

The generator 10 also contains a cryptographic module 22 capable of executing cryptographic algorithms in order to construct a cryptogram of the control word CW.

The generator 12 is capable of generating cryptographic keys, and especially the license key $K_{Term}$, and of transmitting the keys so generated to the generator 10 and also to the manager 16.

The module 14 is capable of multiplexing the scrambled multimedia program with ECM messages generated by the generator 10 and EMM messages generated by the generator 12 in order to obtain multiplexed contents. Typically, the ECM messages multiplexed with the scrambled multimedia program contain a cryptogram of the control word CW used to scramble this multimedia program. The ECM messages also generally contain access conditions associated with the scrambled multimedia program.

The EMM messages generally contain information, such as keys or rights, authorizing a terminal to correctly unscramble, or preventing it from correctly unscrambling, the scrambled multimedia programs received, so that it can use them.

The module 14 is also capable of encapsulating each of the multiplexed contents in IP (Internet Protocol) frames.

Here, the multimedia programs are generated by different service operators. In order to simplify FIG. 1, only one operator 20 has been shown.

The manager 16 is capable of communicating the license key $K_{Term}$ by way of a point-to-point link established with a given terminal using its unicast address. The manager 16 also comprises a cryptographic module 24 capable of executing different cryptographic functions and, in particular, a cryptographic algorithm $A_{Ks}$ and a hash function $H_s$.

The messages generated by the manager 16 containing the license key $K_{Term}$ are here called ECM-U messages and have a structure identical to conventional ECM messages. In particular, these ECM-U messages comprise a field which is to receive a cryptogram and a field which is to receive access conditions. However, unlike a conventional ECM message, which is aimed at all of the security processors of an operator, an ECM-U message has the peculiarity of being able to be processed by only one single security processor for which it has been generated using keys individualized for this security processor. What is involved here is implicit individual addressing. It should be noted that, similarly, a message denoted ECM-S can address a group of security processors sharing the same group identifier and the same keys.

By way of illustration, the items of secret information contained in the memory 18 are here:
- a root key $K_{rootECMU}$,
- a list of security processor keys $K_{ProcU}$ associating with each UA identifier of a security processor the key $K_{ProcU}$ pre-recorded in this security processor,
- a list of receiver keys $K_r$ associating with each receiver STBId identifier a key $K_r$, and
- a key $K_{license}$ for encrypting the license key $K_{Term}$.

The memory 18 is connected to the generator 10 and to the manager 16.

The network used to transmit the multiplexed contents as well as the ECM-U messages to the various terminals is a broadband network 30 using the IP protocol (Internet Protocol). It will be remembered that this protocol calls for routers suitable for routing an information frame to a specified address. In the IP protocol, a multicast address enables a point-to-multipoint link to be established. Such a multicast address differs from a broadcast address by the fact that the information frames are routed purely to a limited group of several terminals from among all of the terminals connected to the network 30. The multicast address is also different from a unicast address which permits the establishment of a point-to-point link only.

It is assumed here that the terminals 6, 7 and 8 are identical and only the terminal 8 will be described in more detail.

The terminal 8 comprises a receiver 40 associated with a removable security processor 42.

The receiver 40 is equipped with a modem 44, a module 46 for demultiplexing, unscrambling and decoding, and a software module for access control 48.

The receiver 40 also comprises a memory 50 in which it is possible to record the multimedia programs received so that they can be displayed later.

The modem 44 is connected to the network 30 and enables, for example, the multiplexed contents and the ECM-U messages transmitted by the network head 4 to be received.

The module 46 is suitable, in particular, for demultiplexing multiplexed contents received, for transmitting ECM and EMM messages to the module 48, for unscrambling the scrambled multimedia programs in order to generate a multimedia stream which can be used, for example, by being displayed in clear on a screen 52 connected to the terminal 8.

The module 48 provides the interface with the processor 42. In particular, it transmits ECM and EMM messages to the processor 42 and receives from this processor 42 the decrypted control word which must be used by the module 46 to unscramble the multimedia programs received.

Here the module 48 is provided with a cryptographic sub-module 54 capable of executing cryptographic operations such as encryptions or decryptions corresponding to those used by the network head and also the hash function $H_s$.

For that purpose, the sub-module 54 is associated with information-storage means, such as a memory 55 which also contains the secret cryptographic keys enabling it to perform cryptographic operations successfully. By way of example, the memory 55 comprises the key $K_{license}$ and the key $K_r$. These keys have, for example, been preloaded into the terminal 40 during the manufacture thereof or have been received by the terminal 40 by way of an EMM message. The memory 55 also comprises an STBId identifier identifying solely the receiver 40 from among all of the receivers of the system 2.

The processor 42 is, for example, a chip card. This processor 42 is to execute all of the security operations and also the access control in respect of the multimedia programs. For that purpose, it comprises, in particular, an encrypting and decrypting module 56 and also a non-volatile memory 58.

The module 56 is, in particular, capable of executing decryption and encryption algorithms corresponding to those implemented by the network head 4.

The memory 58 contains, inter alia:
- access titles and keys 60,
- a UA identifier identifying solely this security processor from among all of the security processors used in the system 2,
- two pre-recorded unique keys $K_{ECMU}$ and $K_{ProcU}$ suitable for identifying this security processor from among all of the security processors used in the system 2,
- a processing key $K_{Proc}$.

The two keys $K_{ECMU}$ and $K_{ProcU}$ are individualized for this security processor in relationship with the UA identifier. These two keys $K_{ECMU}$ and $K_{ProcU}$ and also the UA identifier are typically preloaded into the memory 58 during the manufacture of the security processor, during the configuration thereof or during the use thereof by way of the EMM message.

The key $K_{Proc}$ is the key used by the network head to produce the cryptogram of the control word inserted in the ECM messages broadcast to each of the terminals of the system 2. Being common to all of the terminals of the operator, this key is typically loaded into the memory 58 by means of an EMM message transmitted by the network head. Typically, this EMM message is broadcast on a multicast broadcast address. For example, this EMM message is multiplexed with the scrambled multimedia program and then broadcast to the terminals.

The operation of the system 2 will now be described with reference to FIGS. 2 to 4.

When the system 2 is in operation, the network head 4 executes a method 80 for broadcasting scrambled multimedia programs and each of the terminals executes in parallel a method 82 for receiving the multimedia programs broadcast by the network head 4.

Initially, at the beginning of the method 80, in a step 90, the generator 12 generates a license key $K_{Term}$. Then, in a step 92, the generator 12 transmits this key $K_{Term}$ to the generator 10 and to the manager 16.

Subsequently, in a step 94, the network head generates a control word CW then, in a step 96, the scrambler 13 scrambles the multimedia program by means of this control word.

At this stage, in a step 98, the generator 10 encrypts by the module 22 the control word CW using an encryption algorithm $A_{Term}$ and the key $K_{Term}$ generated by the generator 12. At the end of step 98, a first cryptogram $CW^*_{KTerm}$ of the control word CW by the key $K_{Term}$ is obtained.

Then, in a step 100, the generator 10 encrypts by the module 22 the cryptogram $CW^*_{KTerm}$ by means of the key $K_{Proc}$ and an encryption algorithm $A_{Proc}$. At the end of step 100, a cyptogram $(CW^*_{KTerm})^*_{KProc}$ of the previous cryptogram $CW^*_{KTerm}$ is obtained.

In a step 102, the generator 10 constructs an ECM message containing the cryptogram $(CW^*_{KTerm})^*_{KProc}$ and access conditions.

Subsequently, in a step 104, the ECM message constructed, any EMM messages, as well as the scrambled multimedia program are multiplexed together to form multiplexed contents. In a step 106, these multiplexed contents are encapsulated in IP (Internet Protocol) frames. The multiplexed contents encapsulated in IP frames are then, in a step 108, broadcast to one or more multicast broadcast addresses.

Steps 94 to 108 are reiterated each time a multimedia program is scrambled by means of a new control word. Steps 90 to 108 are for their part reiterated each time the key $K_{Term}$ is modified.

The receiving method 82 is executed in an identical manner by each of the terminals of the system 2. In order to simplify the description, this method will be described here solely in the case of the terminal 8.

Initially, in a step 120, the terminal 8 monitors the multicast broadcast address on which the multimedia programs are broadcast. Subsequently, in a step 122, the multiplexed contents broadcast are received and then demultiplexed.

In a step 124, the ECM and EMM messages extracted from the multiplexed contents are then transmitted by way of the module 48 to the security processor 42. In a step 126, the security processor 42 compares the access conditions contained in the ECM message with the access titles 60.

If the access titles recorded in the memory 58 do not correspond to the access conditions received, the security processor then acts, in a step 128, in such a manner as to prevent the unscrambling of the scrambled multimedia program received. For example, the security processor does not decrypt the control word contained in the ECM message or does not transmit the decrypted control word to the receiver 40. In step 128, the processor 42 can also transmit an erroneous control word to the receiver 40 instead of the correct control word.

In the case where the access titles correspond to the access conditions received, in a step 130, the module 56 decrypts the cryptogram $(CW^*_{KTerm})^*_{KProc}$ by means of the processing key $K_{Proc}$ contained in the memory 58. Thus, at the end of step 130, the cryptogram $CW^*_{KTerm}$ is obtained.

Subsequently, the processor 42 transmits the cryptogram $CW^*_{KTerm}$ to the receiver 40, in a step 132.

In a step 134, the module 48, and, more precisely, the sub-module 54, decrypts the cryptogram $CW^*_{KTerm}$ with the key $K_{Term}$, received beforehand, in order to obtain the control word CW in clear. The control word CW so obtained is then used, in a step 136, to unscramble the scrambled multimedia program received.

It will therefore be appreciated that, in this embodiment, the control word CW is pre-encrypted by means of the key $K_{Term}$ so that the unscrambling of the multimedia programs received is possible only if the network head has transmitted the key $K_{Term}$ to the terminal beforehand. The manner in which the network head transmits the key $K_{Term}$ to each of the terminals will now be described with reference to FIGS. 3 and 4 in the particular case of the terminal 8.

Figure 2:
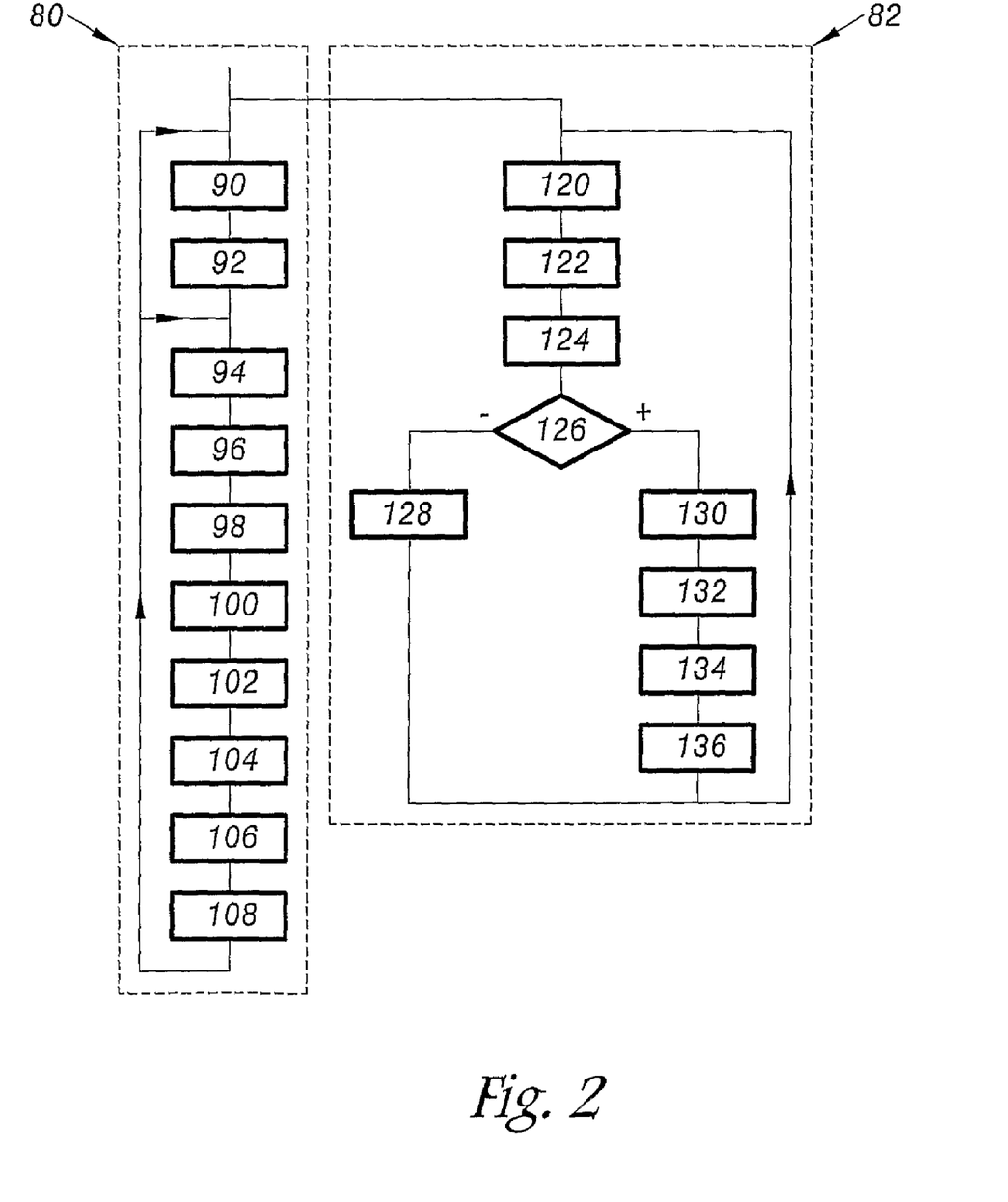
FIG. 2 is a first embodiment of a method for broadcasting and receiving scrambled multimedia programs which is implemented in the system of FIG. 1, FIGS. 3 and 4 are a flow chart of a method for transmitting a license key used in the method of FIG. 2.

In order for the terminal 8 to be able to unscramble scrambled multimedia programs received in accordance with the method of FIG. 2, a point-to-point link is established, in a step 150, between this terminal and the manager 16, typically on the initiative of the terminal. For example, the terminal 8 initiates the establishment of this point-to-point link when the manager 16 is powered up or when it is activated. In order to establish this point-to-point link, the terminal 8 uses the unicast address of the manager 16.

The network head and the terminal 8 then carry out a phase 152 of establishing a secure tunnel on this point-to-point link.

To be more precise, in a step 154, the module 48 sends by way of the point-to-point link, a request to obtain a license permitting it to unscramble the multimedia programs. This request contains a session identifier $ID_{session}$, the STBId identifier, an SOID identifier of the operator and also the UA identifier. The identifier $ID_{session}$ is generated by random selection each time a secure tunnel is established.

In a step 156, the manager 16 receives this request.

In response to this request, the manager 16:

generates a random number $Alea_{Auth}$ and a session key $K_s$ by random selection, in a step 158, determines from the UA identifier received a unique key $K_{ECMU}$ corresponding to the key $K_{ECMU}$ contained in the memory 58 of the terminal 8, in a step 160, concatenates the identifier $ID_{session}$, the number $Alea_{Auth}$ and the session key $K_s$ and then encrypts the result of this concatenation by means of the key $K_r$ corresponding to the STBId identifier received, in order to obtain a first cryptogram, in a step 162, encrypts this first cryptogram with the key $K_{ECMU}$ determined in step 160 in order to obtain a second cryptogram, in a step 164, encapsulates this second cryptogram in an ECM-U message by inserting the second cryptogram into the field provided to receive a cryptogram of a control word in an ECM message, in a step 166, then sends this ECM-U message to the terminal 8 by way of the point-to-point link, in a step 168.

In step 160, the key $K_{ECM}$ is determined from the UA identifier received and data pre-recorded in the memory 18. For example, here, the key $K_{ECMU}$ is generated by varying the root key $K_{RootECMU}$ with the UA identifier received.

In a step 170, the terminal 8 receives the ECM-U message and the module 48 transmits this ECM-U message to the processor 42.

Then, in a step 172, the processor 42 decrypts the second cryptogram by means of the key $K_{ECMU}$ contained in its memory 58 in order to obtain the first cryptogram.

In a step 174, the first cryptogram so obtained is transmitted to the receiver 40 and, in a step 176, the module 48, and, more precisely, the sub-module 54, decrypts this first cryptogram by means of the key $K_r$ contained in its memory 52.

Subsequently, in a step 178, the module 48 compares the identifier $ID_{session}$ decrypted in step 176 with that sent in step 154.

If the identifiers $ID_{session}$ correspond, then the module 58 applies, in a step 180, the hash function $H_s$ to the number $Alea_{Auth}$ in order to obtain a result $R_h$. The hash function $H_s$ is here a one-way hash function.

Subsequently, in a step 182, the module 48 encrypts the result $R_h$ by means of the session key $K_s$ decrypted in step 176 in order to obtain a cryptogram $(R_h)^*_{Ks}$.

In a step 184, the terminal 8 transmits the cryptogram $(R_h)^*_{Ks}$ to the network head 4 by way of the point-to-point link.

In a step 190, the manager 16 receives the cryptogram $(R_h)^*_{Ks}$ and then, in a step 192, decrypts this cryptogram by means of the key $K_s$ generated in step 158, in order to retrieve the result $R_h$.

In a step 194, the manager 16 applies to the number Alea$_{Auth}$ generated in step 158 the same hash function $H_s$ as that which the terminal 8 would have had to use to construct the result $R_h$.

In a step 196, the results $R_h$ obtained at the end of steps 192 and 194 are compared. If the results correspond, then the manager 16 establishes, in a step 198, that the terminal 8 is authentic and all of the other messages exchanged by way of the point-to-point link are encrypted by means of the session key $K_s$.

In the case where the identifiers ID$_{session}$ compared in step 178, or the results $R_h$ compared in step 196, do not correspond, then the mutual authentication of the terminal 8 and the network head 4 has failed, and a secure tunnel for the transmission of information between this terminal and the network head is not established. In addition, in a step 200, the manager 16 and/or the terminal 8 act in such a manner as to prevent the unscrambling of the scrambled multimedia programs received. For example, in step 200, the manager 16 prevents the transmission of the key $K_{Term}$ to the terminal 8. Typically, the manager 16 interrupts the point-to-point connection established before it has been possible to transmit the key $K_{Term}$.

In the case where the mutual authentication of the terminal 8 and the network head has been successful, in a step 210, the manager 16 encrypts the key $K_{Term}$ with the key $K_{license}$ in order to obtain a cryptogram $(K_{Term})^*_{Klicense}$.

In a step 212, this cryptogram $(K_{Term})^*_{Klicense}$ is encrypted by means of the key $K_{ProcU}$ in order to obtain a cryptogram $((K_{Term})^*_{Klicense})^*_{KProcU}$. Subsequently, in a step 214, this cryptogram $((K_{Term})^*_{Klicense})^*_{KProcU}$ is inserted in an ECM-U message associated with conditions of access to this key $K_{Term}$.

In a step 216, this ECM-U message is transmitted by way of the secure tunnel established between the terminal 8 and the manager 16. Thus, in step 216, this message is encrypted by the manager 16 by means of the key $K_s$.

In a step 218, the terminal 8 receives this ECM-U message and then, in a step 220, decrypts the ECM-U message by means of the key $K_s$.

In a step 222, the module 48 transmits the decrypted ECM-U message to the security processor.

In a step 224, the processor 42 compares the access conditions contained in this ECM-U message with the access title 60.

If the access conditions do not correspond to the access title contained in the memory 58, in a step 226, the processor 42 acts in such a manner as to prevent the decryption of the control words CW by means of the key $K_{Term}$ contained in this ECM-U message. For example, the processor 42 does not decrypt cryptograms of the key $K_{Term}$.

Otherwise, that is to say, if the access titles do correspond to the access conditions, in a step 228, the module 56 decrypts the cryptogram $((K_{Term})^*_{Klicense})^*_{KProcU}$ by means of the key $K_{ProcU}$ contained in the memory 58 in order to retrieve the cryptogram $(K_{Term})^*_{Klicense}$.

The cryptogram $(K_{Term})^*_{Klicense}$ is then transmitted, in a step 230, to the receiver 40. In a step 232, the module 48, and, more precisely, the sub-module 54, decrypts the cryptogram $(K_{Term})^*_{Klicense}$ by means of the key $K_{license}$ contained in the memory 52 in order to obtain the key $K_{Term}$ in clear.

In a step 234, the key $K_{Term}$ in clear is, for example, stored in the memory 55 in order to be used to decrypt the control words CW pre-encrypted by means of the same key $K_{Term}$.

It will be appreciated that steps 154 to 178 form a step of authentication of the network head by the terminal. Steps 158 to 196, for their part, form a step of authentication of the terminal by the network head.

Figure 5:
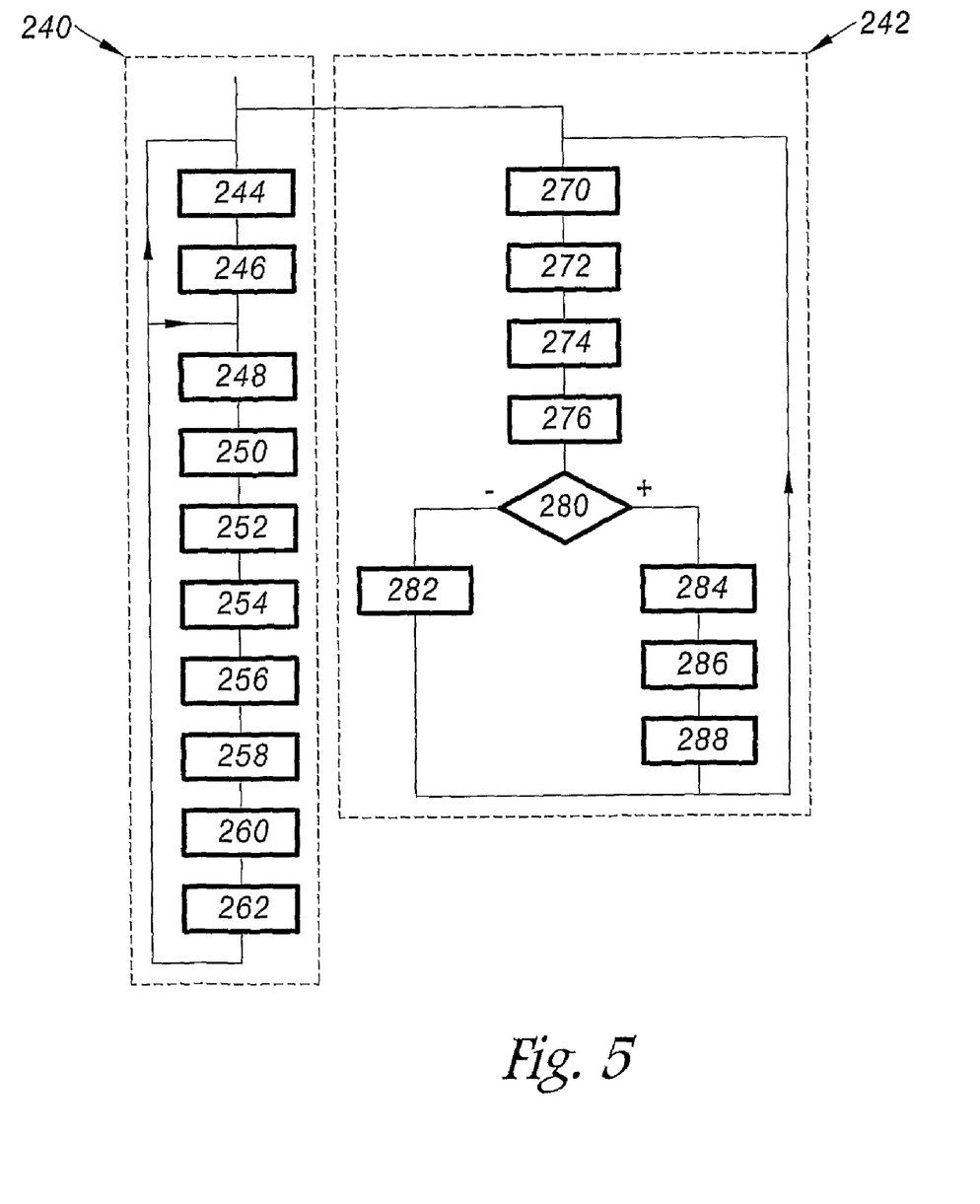
FIG. 5 is a flow chart of a second embodiment of a method for broadcasting and receiving scrambled multimedia programs which is suitable for implementation in the system of FIG. 1.

FIG. 5 represents another method 240 for broadcasting scrambled multimedia programs which can be used by the network head 4, and another method 242 for receiving these scrambled multimedia programs which can be used by the terminals 6 to 8.

Steps 244, 246, 248 and 250 of the method 240 are identical to steps 90, 92, 94 and 96, respectively, of the method 80.

Subsequently, in a step 252, the generator 10 encrypts the control word by means of the key $K_{Proc}$ in order to obtain a cryptogram CW*.

In a step 254, this cryptogram CW* and also access conditions are incorporated in an ECM message.

Subsequently, in a step 256, at least the portion of the ECM message containing the cryptogram CW* is super-encrypted with the key $K_{Term}$ in order to obtain a cryptogram ECM*.

In a step 258, the cryptogram ECM*, any EMM messages and the scrambled multimedia program are multiplexed by the multiplexer 14 in order to obtain multiplexed contents.

Subsequently, in steps 260 and 262, these multiplexed contents are encapsulated and broadcast on the network 30 in a manner identical to that which has been described with reference to steps 106 and 108.

Steps 248 to 262 are reiterated for each new control word, while steps 244 to 262 are reiterated each time the key $K_{Term}$ is modified.

The method 242 starts by steps 270 and 272, which are identical to steps 120 and 122, respectively, of the method 82.

Subsequently, in a step 274, the module 48, and, more precisely, the sub-module 54, decrypts the cryptogram ECM* by means of the key $K_{Term}$ in order to retrieve the ECM message in clear.

The ECM message in clear and any EMM messages contained in the multiplexed contents are then transmitted to the security processor 42, in a step 276.

In a step 280, the processor 42 compares the access conditions contained in the ECM message with the access titles 60. If these access titles do not correspond to the access conditions, in a step 282, the processor 42 acts in such a manner as to prevent the complete unscrambling of the scrambled multimedia programs received.

Otherwise, in a step 284, the module 56 decrypts the cryptogram CW* by means of the key $K_{Proc}$ in order to retrieve the control word CW in clear.

In a step 286, this control word CW is then transmitted to the receiver 40.

Then, in a step 288, the receiver 40 unscrambles the scrambled multimedia program received by means of the control word CW transmitted in step 286.

Steps 270 to 288 are reiterated at least for each new control word, CW.

In this second embodiment, the control word CW is super-encrypted by means of the key $K_{Term}$ instead of being pre-encrypted. However, as in the embodiment of FIG. 2, the unscrambling of the scrambled multimedia programs received is possible only if the terminal has received the key $K_{Term}$ beforehand. For that purpose, the method of transmitting this key $K_{Term}$ already described with reference to FIGS. 3 and 4 is implemented, for example.

Numerous other embodiments are possible. For example, networks other than a network using the IP protocol may be used instead of the network 30 provided that this network permits the use of multicast and unicast addresses in a manner similar to that permitted by the IP protocol.

The security processor 42 can be integrated in the receiver 40. In a variant, the modules 46 and 48 can be implemented in a removable module.

The various functionalities of the terminal 8 can be distributed between various pieces of equipment connected to each other by a local network. For example, these various functionalities may be distributed between a local gateway called a "home gateway" and a local decoder, it being possible for the one or the other to receive the security processor 42. The gateway is then the element connected to the network 30 that monitors the multicast or unicast addresses. Subsequently, the information received from the network 30 is transmitted, on the local network, to the local decoder. In such an architecture, the gateway may, for example, deal with the processing of the ECM messages in order to extract from them the control words necessary to unscramble the scrambled multimedia programs. Other architectures for the terminal 8 are of course possible.

The modem 44 can be integrated in the receiver 40 or can be placed externally.

Figure 3:
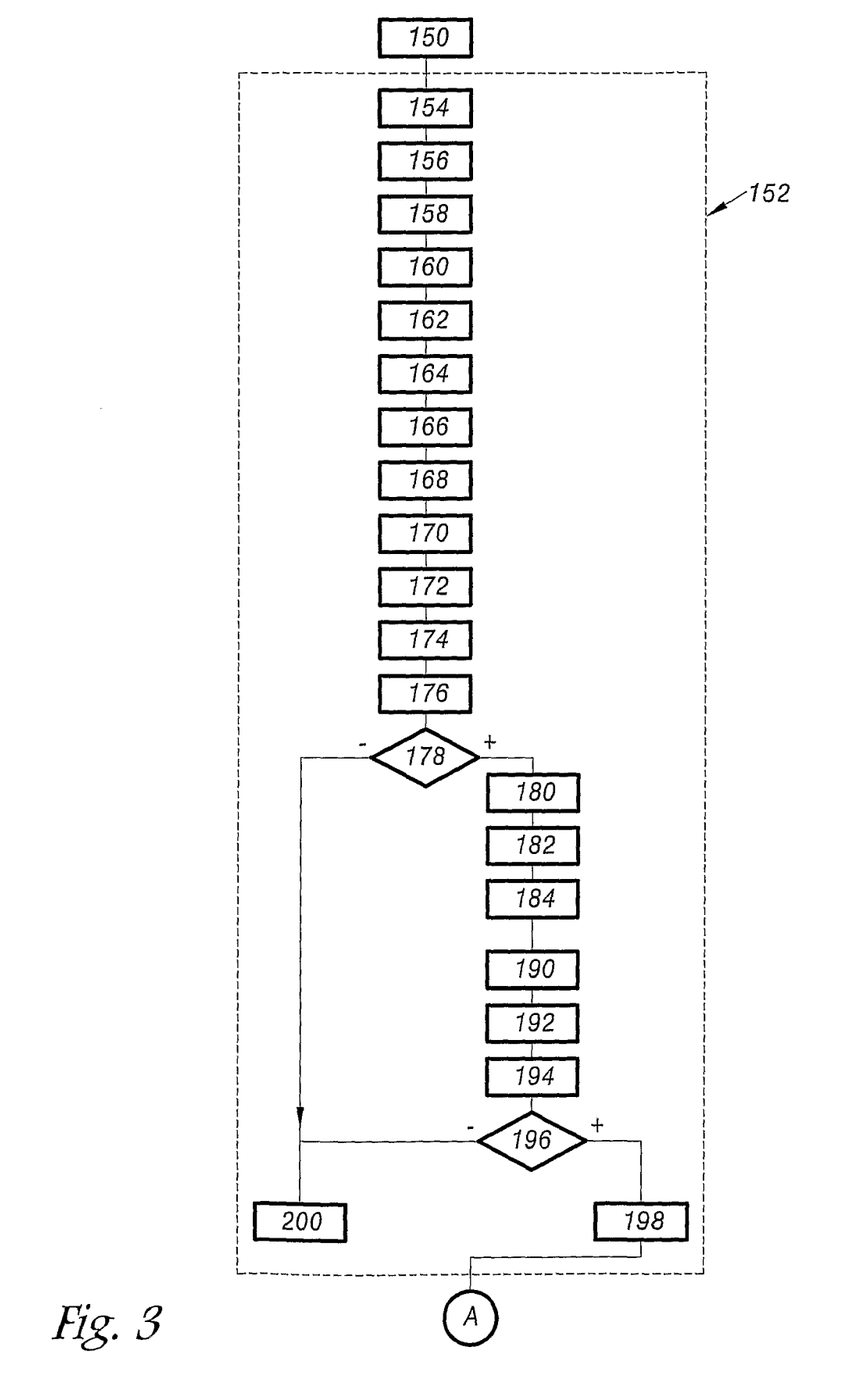
Figure 4:
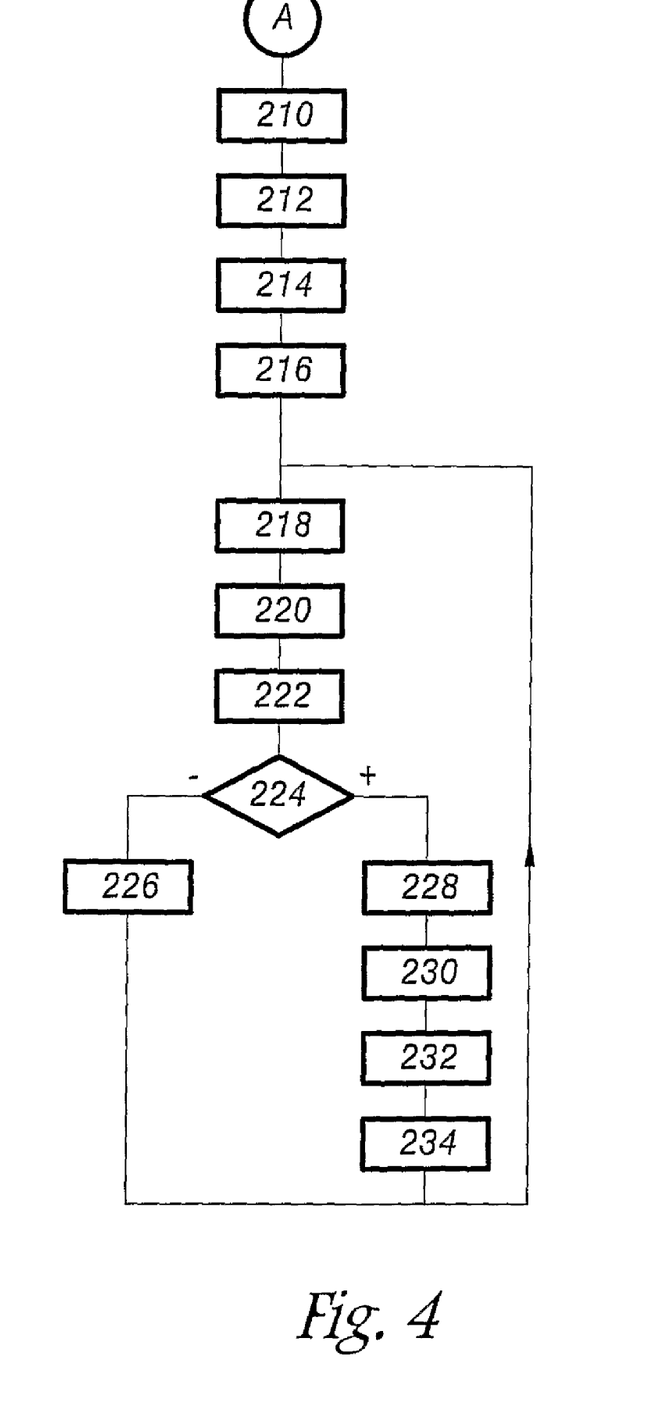

The method of FIGS. 3 and 4 has been described in the particular case where the ECM-U message contains an access condition. In a variant, such an access condition is not used, so that the terminal is authorized to decrypt the key $K_{Term}$ irrespective of the access titles 60 recorded in its memory 58.

The embodiments of FIGS. 2 and 5 can be combined in order to apply both the pre-encryption and the super-encryption of the control word. Under these conditions, the decryption of the control word CW requires the use of two license keys $K_{Term}$, one used to effect the pre-encryption and the other used to effect the super-encryption.

The keys $K_{Term}$, $K_{license}$ and $K_{ProcU}$ may be either unique to each terminal of the system 2 or common to a group of terminals of the system 2 or common to all of the terminals of the system 2.

Here, the system 2 has been described in the particular case where the key $K_{Term}$ is transmitted in an ECM-U message having a structure identical to that of an ECM message. In a variant, the key $K_{Term}$ is transmitted by the manager 16 to the terminal 8 using an EMM message and preferably an EMM-U message.

The keys $K_{ECMU}$ and $K_{ProcU}$ individualized in accordance with the UA identifier can be obtained either by varying a root key by means of the UA identifier, or from a database associating the unique keys $K_{ECMU}$ and $K_{ProcU}$ with each UA identifier. Likewise, the receiver key $K_r$ can be obtained by varying a root key from the STBId identifier or from a database associating a key $K_r$ with each STBId identifier.

The system 2 and the methods described here can be applied equally well to multimedia programs broadcast live, such as, for example, a televised transmission broadcast live, and to pre-recorded multimedia programs which can be down-loaded on demand by a user of the terminal, such as, for example, in the context of a VOD (Video On Demand) service.

The system 2 and also the methods described here can also be applied to a PVR (Personal Video Recorder) operations service which enables multimedia contents to be recorded in, and re-read from, the memory 50, such as described, for example, in patent application FR 2 835 178. For this PVR service, the ECM messages associated with the contents received by the terminal comprise:

a) a portion dedicated to the direct display of the contents, and b) a portion dedicated to the recording and the re-reading of the multimedia program received.

The portion a) contains the normal elements of an ECM message, especially the cryptogram of the control word CW.

The portion b) also contains normal elements of an ECM message, such as access conditions and a cryptogram of the control word, but these are intended to be extracted and then, after local processing in the terminal, recorded with the recorded multimedia program in the memory 50. These recorded ECM messages then enable the recorded multimedia program to be re-read. The system and the method described here can also be applied to recorded ECMs.

The embodiments of the system and of the methods described here have the following advantages:

using a secure tunnel to transmit the key $K_{Term}$ to the terminal increases the security of the system;

the fact that the network head checks that the terminal is capable of correctly encrypting or decrypting data with the key $K_{ECMU}$ determined in step 160, enables the terminal to be reliably authenticated because only the network head 4 can determine the key $K_{ECMU}$ associated with the unique UA identifier of the terminal, so that only an authentic terminal can possess in its memory a key $K_{ECMU}$ corresponding to that thus determined by the network head;

using the structure of an ECM message to submit to the terminal an authentication challenge in step 168 simplifies the implementation of the system because it is not necessary to develop a new message structure in order to submit this authentication challenge, involving the key $K_{ProcU}$ in the encryption of the key $K_{Term}$ makes the pirating of the method more difficult because this necessarily involves the security processor 42 which is an element which is difficult to falsify, effecting a double-encryption of the key $K_{Term}$ transmitted to the terminal by means, on the one hand, of a key of the receiver (here the key $K_{license}$) and, on the other hand, of a key of the security processor (here the key $K_{ProcU}$) permits the creation of a pairing between this security processor and this receiver, carrying out the authentication of the network head by the terminal also increases the security of the system, checking that the network head is capable of correctly encrypting and/or decrypting data with the key $K_{ECMU}$ which it has determined enables this network head to be reliably authenticated because only the authentic network head can determine the key $K_{ECMU}$ used by the terminal and associated with the unique UA identifier thereof, pre-encrypting the control word by means of the key $K_{Term}$ has the advantage that this control word is then transmitted on the terminal side only in an encrypted form between the processor 42 and the receiver 40, which protects the interface between this processor and this receiver.

The invention claimed is:

1. Method for broadcasting a scrambled multimedia program by way of a broadband network, wherein:

information can be routed to a multicast address so that only one group of several terminals corresponding to this multicast address receives the information while other terminals connected to the same network do not receive this information, and information can be routed to a unicast address so that only the terminal corresponding to this unicast address receives the information while the other terminals connected to the same network do not receive it, and wherein a network head:

scrambles the multimedia program with a control word, encrypts the control word in order to obtain a first cryptogram, encrypts the first cryptogram in order to obtain a second cryptogram, the first and second encryptions being effected by means of different encryption keys selected from the group composed of a processing key ($K_{Proc}$) and a license key ($K_{Term}$), multiplexes the second cryptogram with the scrambled multimedia program to obtain multiplexed contents, broadcasts the multiplexed contents to a multicast broadcast address in order to establish a point-to-multipoint connection between the network head and several receivers of the multiplexed contents, and on a point-to-point link established with a terminal using the unicast address of this terminal, transmits the license key individually to this terminal by way of this point-to-point link, characterized in that, before the transmission of the license key:

the network head carries out a step of authenticating the terminal, and if the terminal has been successfully authenticated, the network head sends to the terminal a license transmission message containing the license key or a cryptogram of the license key, by way of the point-to-point link established, and if the terminal is not successfully authenticated, the network head acts in such a manner as to prevent the complete unscrambling by this terminal of the scrambled multimedia program broadcast;

wherein the network head carries out a phase of establishing a secure tunnel on the point-to-point link established, during which, if the terminal has been successfully authenticated:

the network head establishes, by random selection, a session key common to the terminal and to the network head, then sends to the terminal the license transmission message encrypted with this session key.

2. Method according to claim 1, wherein, during the authentication step, the network head:

determines a unique key ($K_{ECMU}$) suitable for identifying the terminal from among all of the terminals connected to the network, on the basis of:

pre-recorded data which are known to the network head and which have not been transmitted to it by the terminal, and data transmitted (UA) by the terminal to the network head, the pre-recorded data and the transmitted data each being insufficient by themselves to permit the determination of the unique key ($K_{ECMU}$) used by this terminal, checks that the terminal is capable of correctly encrypting or decrypting data with the unique key which it has determined without the network head having had to transmit to this terminal beforehand the pre-recorded data or the unique key ($K_{ECMU}$) determined, and, in the affirmative, establishes that the terminal is authenticated.

3. Method according to claim 2, wherein, in order to check that the terminal is capable of correctly decrypting encrypted data with the unique key ($K_{ECMU}$) determined, the network head sends an ECM message (Entitlement Control Message) to the terminal in which the field which is to contain a cryptogram of a control word contains a cryptogram obtained by encrypting a datum ($Alea_{Auth}$) unknown to the terminal by means of the unique key ($K_{ECMU}$) determined, then checks that the datum unknown to the terminal has been correctly decrypted by this terminal.

4. Method according to claim 1 for a terminal equipped with a security processor containing a security processor key ($K_{ProcU}$), wherein the network head encrypts the license key ($K_{Term}$) at least by means of the key ($K_{ProcU}$) of the security processor of the terminal in order to obtain a cryptogram of the license key ($K_{Term}$), and incorporates this cryptogram of the license key ($K_{Term}$) in the license transmission message.

5. Method for receiving multimedia programs broadcast by means of a broadcasting method according to claim 4, and by means of a terminal equipped with a security processor containing a processor key ($K_{ProcU}$), wherein the security processor decrypts the cryptogram of the license key ($K_{Term}$) by means of the processor key ($K_{ProcU}$).

6. Method according to claim 1 for a terminal equipped with a receiver containing a key ($K_{license}$) for encrypting the license key and with a removable security processor containing a security processor key ($K_{ProcU}$), the processor key initially being known solely to the security processor and the key for encrypting the license key initially being known to the receiver, wherein the network head:

carries out consecutively over time a first and second encryption of the license key ($K_{Term}$) in order to obtain a cryptogram of the license key ($K_{Term}$), the first and second encryptions being carried out by means of different encryption keys selected from the group composed of the processor key ($K_{ProcU}$) and the key ($K_{license}$) for encrypting the license key, and incorporates this second cryptogram of the license key in the license transmission message.

7. Method for receiving a scrambled multimedia program broadcast by means of a broadcasting method according to claim 1, wherein the terminal:

monitors the multicast broadcast address and receives the multiplexed contents, demultiplexes the multiplexed contents received in order to obtain the second cryptogram and the scrambled multimedia program, decrypts the second cryptogram in order to obtain the first cryptogram, decrypts the first cryptogram in order to obtain the control word, the first and second decryptions being effected by means of different encryption keys selected from the group composed of the processing key ($K_{Proc}$) and the license key ($K_{Term}$), and unscrambles the scrambled multimedia program with the control word, characterized in that, during the authentication step, the terminal cooperates with the network head in order to be authenticated.

8. Method according to claim 7, for receiving a multimedia program broadcast in accordance with a method for broadcasting a scrambled multimedia program by way of a broadband network, wherein:

information can be routed to a multicast address so that only one group of several terminals corresponding to this multicast address receives the information while other terminals connected to the same network do not receive this information, and information can be routed to a unicast address so that only the terminal corresponding to this unicast address receives the information while the other terminals connected to the same network do not receive it, and wherein a network head:

scrambles the multimedia program with a control word, encrypts the control word in order to obtain a first cryptogram, encrypts the first cryptogram in order to obtain a second cryptogram, the first and second encryptions being effected by means of different encryption keys selected from the group composed of a processing key ($K_{Proc}$) and a license key ($K_{Term}$), multiplexes the second cryptogram with the scrambled multimedia program to obtain multiplexed contents, broadcasts the multiplexed contents to a multicast broadcast address in order to establish a point-to-multipoint connection between the network head and several receivers of the multiplexed contents, and on a point-to-point link established with a terminal using the unicast address of this terminal, transmits the license key individually to this terminal by way of this point-to-point link, characterized in that, before the transmission of the license key:

the network head carries out a step of authenticating the terminal, and if the terminal has been successfully authenticated, the network head sends to the terminal a license transmission message containing the license key or a cryptogram of the license key, by way of the point-to-point link established, and if the terminal is not successfully authenticated, the network head acts in such a manner as to prevent the complete unscrambling by this terminal of the scrambled multimedia program broadcast, wherein the network head carries out a phase of establishing a secure tunnel on the point-to-point link established, during which, if the terminal has been successfully authenticated:

the network head establishes, by random selection, a session key common to the terminal and to the network head, then sends to the terminal the license transmission message encrypted with this session key, wherein, during the phase of establishing the secure tunnel:

a) if the terminal has been successfully authenticated, the terminal cooperates with the network head to establish the common session key ($K_s$) and decrypts the license transmission message received by means of the common session key, and b) if the terminal is not successfully authenticated, the terminal is prevented from unscrambling the multimedia program.

9. Method according to claim 7, wherein the terminal also carries out a step of authenticating the network head and, if the network head has been successfully authenticated, the terminal obtains the license key from the license transmission message whereas, if the network head has not been successfully authenticated, the terminal is prevented from unscrambling the multimedia program.

10. Method according to claim 9, for a terminal capable of encrypting or decrypting cryptograms by means of a predetermined unique key ($K_{ECMU}$), this unique key ($K_{ECMU}$) identifying this terminal in a unique manner from among all of the terminals connected to the network, and wherein, during the step of authenticating the network head, the terminal checks that the network head is capable of correctly encrypting or decrypting data with the unique key ($K_{ECMU}$) determined by the network head on the basis of:

pre-recorded data which are known to the network head and which have not been transmitted to it by the terminal, and data (UA) transmitted by the terminal to the network head, the pre-recorded data and the transmitted data each being insufficient by themselves to permit the determination of the unique key ($K_{ECMU}$) of this terminal.

11. Method according to claim 7 for a terminal equipped with a receiver containing a key ($K_{license}$) for encrypting the license key and with a removable security processor containing a processor key ($K_{ProcU}$) the processor key initially being known solely to the security processor and the key for encrypting the license key initially being known to the receiver, wherein the security processor and the receiver carry out consecutively a first and second decryption of a cryptogram of the license key ($K_{Term}$), the first and second decryptions being carried out by means of a different first and second decryption key, respectively, selected from the group composed of the processor key ($K_{ProcU}$) and the key ($K_{license}$) for encrypting the license key.

12. Terminal for receiving scrambled multimedia programs, characterized in that this terminal is capable of implementing a receiving method according to claim 7.

13. Receiver of scrambled multimedia programs, characterized in that it is capable of being associated with a removable security processor in order to form a receiving terminal according to claim 12.

14. Removable security processor, characterized in that it is capable of being associated with a receiver of scrambled multimedia programs in order to form a receiving terminal according to claim 12.

15. Network head, characterized in that this network head is capable of implementing a method for broadcasting scrambled multimedia programs according to claim 1.

* * * * *